(12) United States Patent
Park et al.

(10) Patent No.: US 10,411,423 B1
(45) Date of Patent: *Sep. 10, 2019

(54) OSFP TO OSFP MODULE FORM FACTOR ADAPTER

(71) Applicant: Arista Networks, Inc., Santa Clara, CA (US)

(72) Inventors: Youngbae Park, Santa Clara, CA (US); Jiayi Wu, Santa Clara, CA (US); Warren Meggitt, Santa Clara, CA (US); Richard Hibbs, Santa Clara, CA (US); Robert Wilcox, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,399

(22) Filed: Oct. 17, 2017

Related U.S. Application Data

(63) Continuation of application No. 15/217,653, filed on Jul. 22, 2016, now Pat. No. 9,793,667.

(51) Int. Cl.
H04B 1/38 (2015.01)
H01R 27/02 (2006.01)
H01R 12/79 (2011.01)
H04B 10/25 (2013.01)
H04B 10/40 (2013.01)

(52) U.S. Cl.
CPC ............. H01R 27/02 (2013.01); H01R 12/79 (2013.01); H04B 1/38 (2013.01); H04B 10/25 (2013.01); H04B 10/40 (2013.01)

(58) Field of Classification Search
CPC .... H01R 12/79; H01R 13/6587; H01R 12/62; H01R 27/02; H04B 10/40; H04B 10/25; H04B 1/38
USPC .................................................. 375/219–222
See application file for complete search history.

(56) References Cited

U.S. PATENT DOCUMENTS

| | | | | |
|---|---|---|---|---|
| 9,793,667 B1* | 10/2017 | Park | ........................ | H04B 1/38 |
| 9,929,500 B1* | 3/2018 | Ista | ...................... | G02B 6/4261 |
| 2018/0041280 A1* | 2/2018 | Elahmadi | ........... | H04B 10/6162 |
| 2018/0188465 A1* | 7/2018 | Zer | ...................... | G02B 6/4441 |
| 2019/0108161 A1* | 4/2019 | Nagarajan | ............... | G06F 13/42 |

* cited by examiner

Primary Examiner — Emmanuel Bayard
(74) Attorney, Agent, or Firm — Womble Bond Dickinson (US) LLP

(57) ABSTRACT

An adapter for a communication transceiver is provided. The adapter includes a main body having a first end and opposed second end. The first end of the main body has an OSFP (octal small form factor pluggable) edge connector arranged for electrical and physical connection to an OSFP host connector in an OSFP host port. The main body has a QSFP (quad small form factor pluggable) host connector arranged to receive a QSFP edge connector of a QSFP transceiver through the second end of the main body so that the adapter adapts the QSFP transceiver to an OSFP host. A method of using a communication adapter is also provided.

11 Claims, 8 Drawing Sheets

OSFP TO OSFP MODULE FORM FACTOR ADAPTER

BACKGROUND

QSFP (quad small form factor pluggable) is a transceiver form factor that supports high data rates in network communication, presently up to 100 G (gigabits per second), as defined in the EIA SFF-8436 (Electronic Industries Alliance Small Form Factor 8436) and related published standards. Existing versions of QSFP include QSFP, QSFP+ and QSFP28+. OSFP (octal small form factor pluggable) is proposed as another transceiver form factor to support even higher data rates, for example up to 400 G. While QSFP and OSFP have physically different form factors, in some environments such as network data centers, there are configurations and combinations of new and old hardware, which pose compatibility problems. It is hence desirable to connect between the QSFP form factor and the OSFP form factor, supporting upgrade paths in these environments without requiring sudden or widespread obsolescence of equipment. It is within this context that the embodiments arise.

SUMMARY

In some embodiments, an adapter for a communication transceiver is provided. The adapter includes a main body having a first end and opposed second end. The first end of the main body has an OSFP (octal small form factor pluggable) edge connector arranged for electrical and physical connection to an OSFP host connector in an OSFP host port. The main body has a QSFP (quad small form factor pluggable) host connector arranged to receive a QSFP edge connector of a QSFP transceiver through the second end of the main body so that the adapter adapts the QSFP transceiver to an OSFP host.

In some embodiments, an adapter for a communication transceiver and a communication host is provided. The adapter includes a housing having opposed first and second ends. The first end of the housing is dimensioned to fit an OSFP (octal small form factor pluggable) host port and the second end of the housing is dimensioned to receive a QSFP (quad small form factor pluggable) transceiver so as to have an OSFP host having the OSFP host port cooperate with the QSFP transceiver through the adapter.

In some embodiments, a method of using a communication adapter is provided. The method includes connecting a QSFP (quad small form factor pluggable) to OSFP (octal small form factor pluggable) adapter into an OSFP port in an OSFP host, and connecting a QSFP transceiver into the QSFP to OSFP adapter.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A QSFP (quad small form factor pluggable) to OSFP (octal small form factor pluggable) adapter, described with reference to FIGS. 1-10, and several alternatives described with reference to FIGS. 11A-11D, provide connectivity solutions between the differing form factors of QSFP and OSFP. Of these connectivity solutions, the QSFP to OSFP adapter has an advantage of supporting various cable formats, including LC (Lucent) optical cable and MPO (multifiber push on) optical cable, and copper cables, thus not requiring custom cables or custom modules specific to cable types. Further, since a host OSFP port can support (lower) QSFP signal speeds, it is desirable to enable plugging a QSFP module into an OSFP connector (i.e., in the host OSFP port). A solution allowing this supports a network system that has a number of QSFP modules where it is desired to upgrade a host to OSFP, so that the QSFP modules and associated cabling need not be obsoleted.

One embodiment of the QSFP to OSFP adapter has a thin walled structure so that the QSFP transceiver, which is smaller at the front, in height and width, than an OSFP host port, fits inside of the QSFP to OSFP adapter. According to the QSFP standard, the back of a QSFP transceiver, where cables (e.g., optical or copper) are connected, can be thicker than the front of the QSFP transceiver. Dimensions and design of the QSFP to OSFP adapter should be such that the adapter can accept any QSFP transceiver that follows the standard.

In some embodiments, the QSFP to OSFP adapter has a QSFP host connector at the back for receiving the QSFP transceiver, and also has an OSFP edge connector at the front for connecting to an OSFP host connector, e.g., in an OSFP host. In some embodiments, a QSFP host connector available on the market is used. In various embodiments, a flexible circuit board (which could also be termed a flex-rigid board) or a stepped or milled circuit board locates the OSFP edge connector at one height and the mounting for the QSFP host connector at another height, so that the QSFP host connector and the OSFP edge connector align. This supports various QSFP transceivers that have a range of heights or thicknesses within the QSFP standard and can now couple to an OSFP host, with OSFP host ports according to the OSFP standard, through the QSFP to OSFP adapter. Meanwhile, a custom connector can be developed and used for this application instead of using flex-rigid board or milled circuit board can be surely used.

Figure 1:
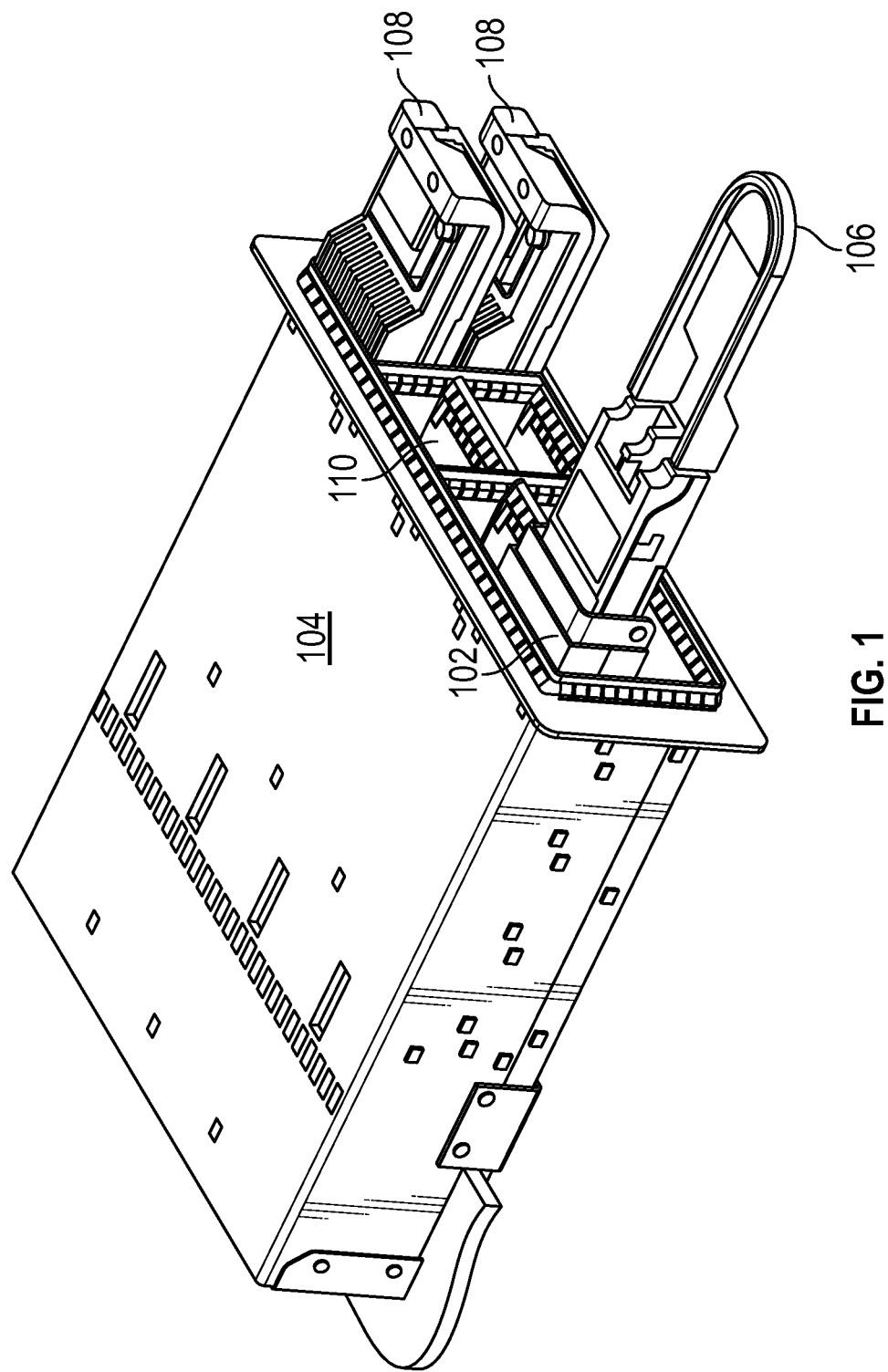
FIG. 1 is a perspective view of an OSFP (octal small form factor pluggable) host, with two OSFP transceivers plugged into the OSFP host, and one QSFP (quad small form factor pluggable) transceiver plugged into a QSFP to OSFP adapter, which is plugged into the OSFP host, in accordance with some embodiments.

FIG. 1 is a perspective view of an OSFP host 104, with two OSFP transceivers 108 plugged into the OSFP host 104, and one QSFP transceiver 106 plugged into a QSFP to OSFP adapter 102, which is plugged into the OSFP host 104, in accordance with some embodiments. The OSFP host 104 has eight OSFP host ports 110, in this example, each of which can receive an OSFP transceiver 108 or the QSFP to OSFP adapter 102. Other hosts with fewer or more ports are readily devised.

Figure 2:
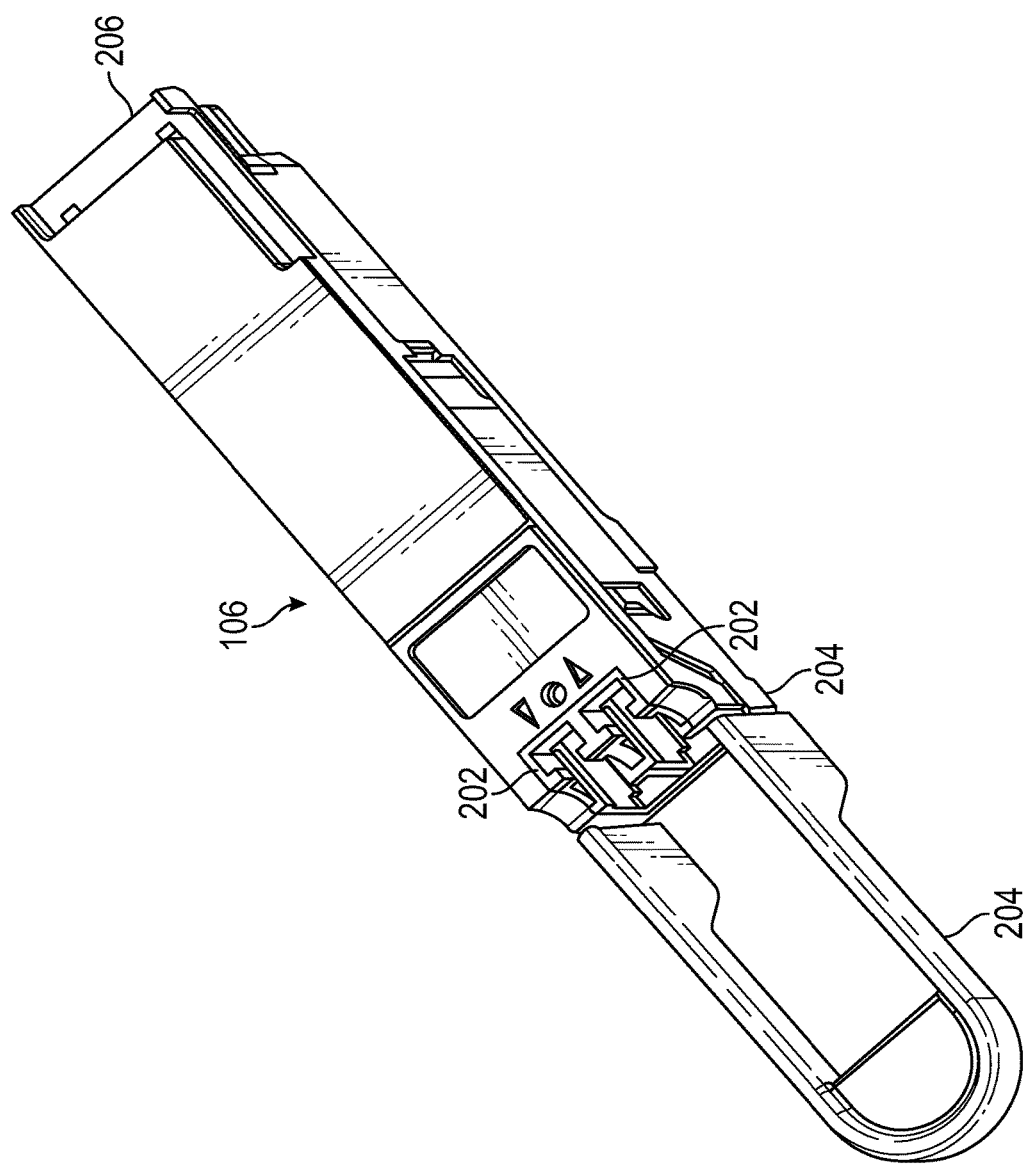
FIG. 2 is a top view of an example QSFP transceiver in accordance with some embodiments.

FIG. 2 is a top view of an example QSFP transceiver 106 in accordance with some embodiments. The front end 206 of the QSFP transceiver 106 has a QSFP edge connector (visible in FIG. 4), and the back 208 of the QSFP transceiver 106 has cable ports 202 for optical cables, or in some versions, copper cables. This embodiment has a handle 204 at the back end 208 of the QSFP transceiver 106, which encourages removal of the QSFP transceiver 106 by grasping the handle 204 rather than grasping the cables. It should be appreciated that other versions may lack the handle 204, which is not required for electrical operation of the transceiver.

Figure 3A:
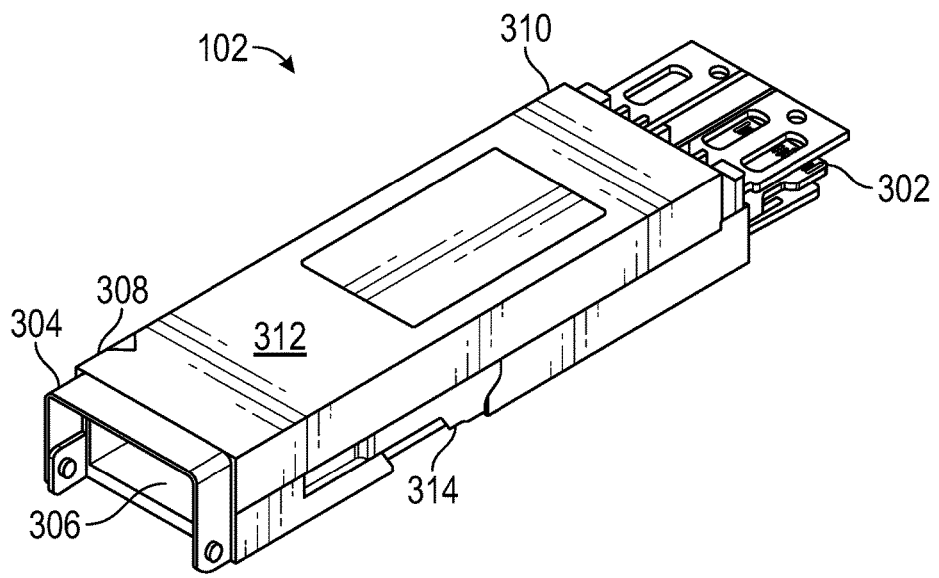
FIG. 3A is a perspective view of an embodiment of the QSFP to OSFP adapter, which receives the QSFP transceiver of FIG. 2 and plugs into the OSFP host port as shown in FIG. 1 in accordance with some embodiments.

FIG. 3A is a perspective view of an embodiment of the QSFP to OSFP adapter 102, which receives the QSFP transceiver 106 of FIG. 2 and plugs into the OSFP host port 110 as shown in FIG. 1. The QSFP to OSFP adapter 102 has a cage 312 that encloses a QSFP connector (not visible in FIG. 3A, but see FIG. 4) and may partially enclose or protect an OSFP edge connector 302 at the front end 310 of the QSFP to OSFP adapter 102. It should be appreciated that cage 312 may be referred to as a case, frame, main body, housing, shell, enclosure, box, etc. A latch 314 is operated by a release handle 304 at the back end 308 of the QSFP to OSFP adapter 102. The release handle 304 is shown in the latch closed position. In one embodiment, the latch 314 retains the QSFP to OSFP adapter 102 in an OSFP host port, and can be released by opening the release handle 304 (see FIG. 3B). A QSFP port 306 at the back end 308 of the QSFP to OSFP adapter 102 is dimensioned to receive a QSFP transceiver 106.

Figure 3B:
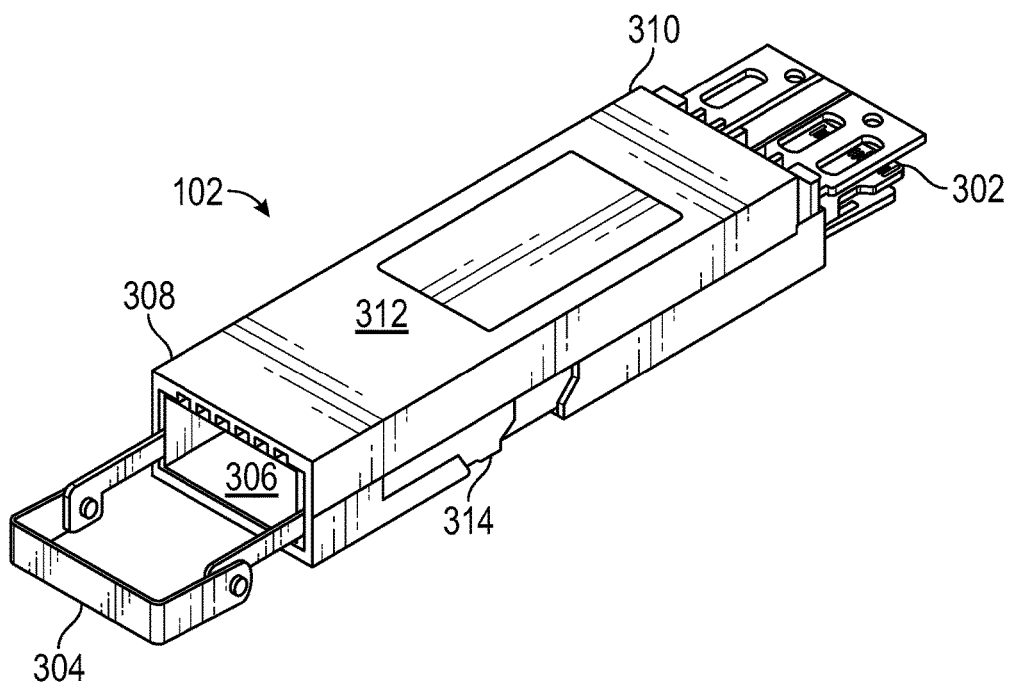
FIG. 3B is a perspective view of the QSFP to OSFP adapter of FIG. 3, with a release in the open position in accordance with some embodiments.

FIG. 3B is a perspective view of the QSFP to OSFP adapter of FIG. 3, with a release in the open position. The release handle 304 is pivoted down and pulled back, which pulls the latch 314 back and releases the QSFP to OSFP adapter 102, e.g., from an OSFP port 110. Having a latch 314 allows the QSFP to OSFP adapter 102 to remain securely seated in an OSFP port 110 with the latch 314 engaged, while inserting or removing a QSFP transceiver 106 to or from the QSFP port 306 of the QSFP to OSFP adapter 102.

Figure 4:
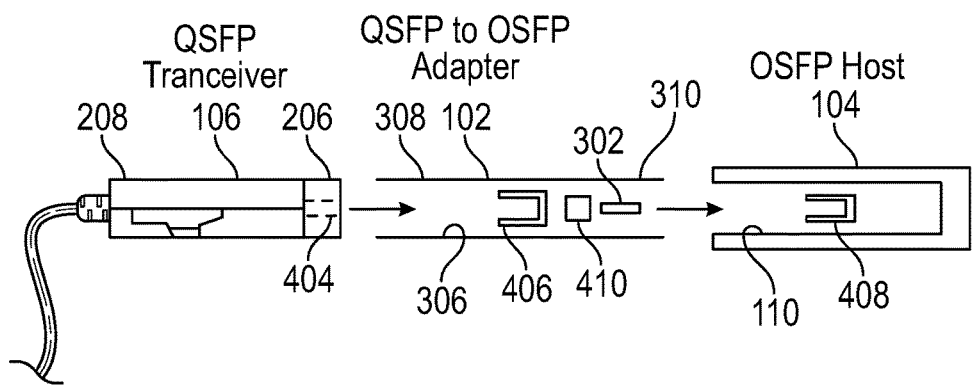
FIG. 4 is a conceptual cross-section view, showing how the QSFP transceiver fits within the QSFP to OSFP adapter, and the QSFP to OSFP adapter fits within the OSFP host in accordance with some embodiments.

FIG. 4 is a conceptual cross-section view, showing how the QSFP transceiver 106 fits into and within the QSFP to OSFP adapter 102, and the QSFP to OSFP adapter 102 fits into and within the OSFP host 104. A cable 402, which could be optical or copper and include one or more cables, according to capabilities or requirements of a particular QSFP transceiver 106, is connected to the back end 208 of the QSFP transceiver 106 for handling high-speed communication of the QSFP transceiver 106 (and the OSFP host 104) to and from a remote host at the other end of the cable 402. In some embodiments, e.g., as shown in FIGS. 3A and 3B with a latch and release mechanism, the QSFP to OSFP adapter 102 is first inserted into the OSFP host port 110 of the OSFP host 104, and then the QSFP transceiver 106 is inserted into the QSFP host port 306 of the QSFP to OSFP adapter 102. In further embodiments, the OSFP transceiver 106 can be first inserted into the back end 308 of the QSFP to OSFP adapter 102, and then the front end 310 of the QSFP to OSFP adapter 102 is inserted into the OSFP host 104. In still further embodiments, either order suffices.

Still referring to FIG. 4, the QSFP edge connector 404 at the front end 206 of the QSFP transceiver 106 mates to the QSFP host connector 406 within the QSFP port 306 of the QSFP to OSFP adapter 102, with the QSFP transceiver 106 embedded in the QSFP to OSFP adapter 102. The OSFP edge connector 302 at the front end 310 of the QSFP to OSFP adapter 102 mates to the OSFP host connector 408 within the OSFP port 110 of the OSFP host 104. Electronic circuitry 410 within the QSFP to OSFP adapter 102 makes signals of the QSFP transceiver 106 and the OSFP host 104 compatible. In one embodiment, the electronic circuitry 410 includes a PLD (programmable logic device and an EEPROM (electrically erasable programmable read-only memory) that bridge signals of the QSFP transceiver 106 and signals of the OSFP host 104. Components of the electronic circuitry 410 are mounted to a circuit board, as described with reference to FIGS. 6, 7A and 7B, in various embodiments.

Figure 5:
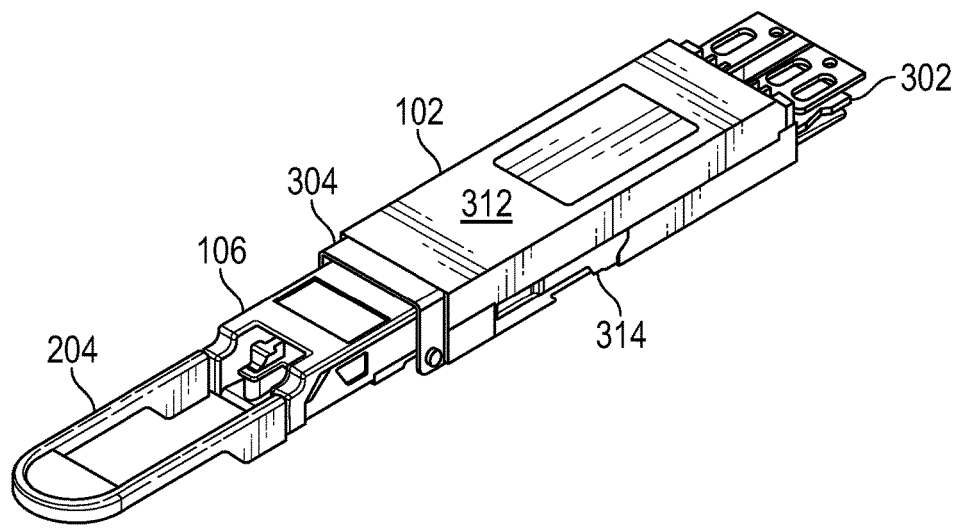
FIG. 5 is a perspective view of the QSFP transceiver of FIG. 2 inserted into the QSFP to OSFP adapter of FIG. 3A in accordance with some embodiments.

FIG. 5 is a perspective view of the QSFP transceiver 106 of FIG. 2 inserted into the QSFP to OSFP adapter 102 of FIG. 3A. In this embodiment, more than half of the main body of the QSFP transceiver 106 (excluding the handle 204, in embodiments that have one) is inside of the QSFP to OSFP adapter 102, however this is not meant to be limiting as more or less of the main body of the QSFP transceiver may be inside of the QSFP to OSFP adapter. In one embodiment, the QSFP transceiver 106 and QSFP to OSFP adapter 102 can be assembled together, then inserted into the OSFP port 110 of the OSFP host 104, with the latch 314 clicking into place and securing the QSFP to OSFP adapter 102 to the OSFP host 104. In some embodiments, since the release handle 304 of the QSFP to OSFP adapter 102 is kept in the latch closed position by the inserted QSFP transceiver 106, the QSFP to OSFP adapter 102 can only be removed from the OSFP host 104 after the QSFP transceiver 106 is removed from the QSFP to OSFP adapter 102, freeing up the release handle 304 to move to the latch opened position shown in FIG. 3B.

Figure 6:
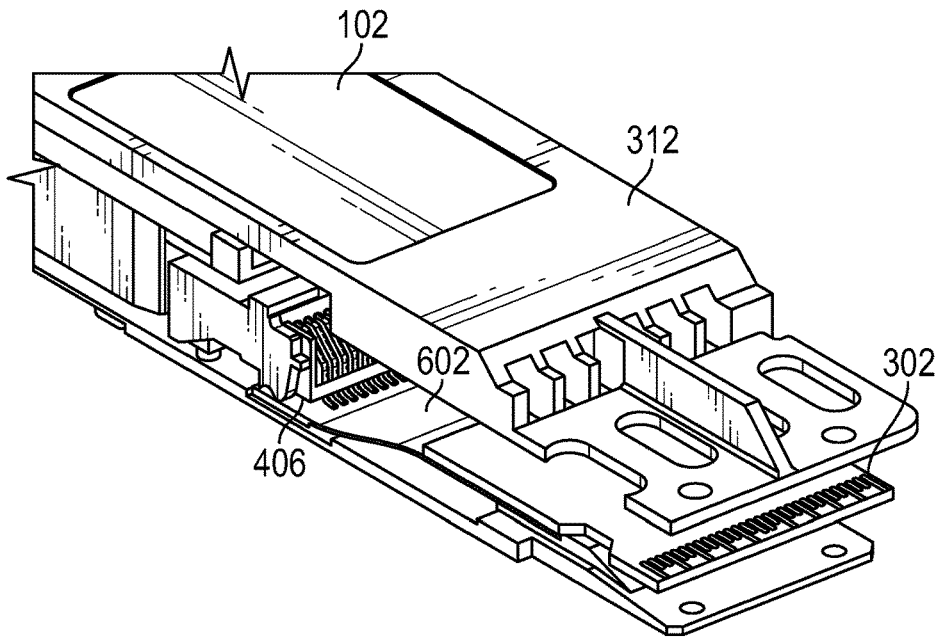
FIG. 6 is a cutaway view of an embodiment of the QSFP to OSFP adapter, showing a flex circuit board flexing to align a QSFP host connector and an OSFP edge connector in accordance with some embodiments.

FIG. 6 is a cutaway view of an embodiment of the QSFP to OSFP adapter 102, showing a flex circuit board 602 flexing to align a QSFP host connector 406 and an OSFP edge connector 302. In this embodiment, the OSFP edge connector 302 is electrically connected to the flexible circuit board 602 (e.g., by soldering) at one end of the flexible circuit board 602, and the QSFP host connector 406 is electrically connected to the other end of the flexible circuit board 602 (e.g., by soldering). Electronic circuits 410 could also be assembled to the flexible circuit board 602 at various locations, thereby enabling electrical connection to pads of the OSFP edge connector 302 and the QSFP host connector 406. As a result of the flexing of the flex circuit board 602, the OSFP edge connector 302 is at one height (or elevation), and the mounting location for the QSFP host connector 406 to attach to the flex circuit board 602 is at another height (or elevation), thus aligning these components in accordance with height (or other dimensional) requirements of respective standards. Alternatives to the flex circuit board 602 are possible as described below.

Figure 7A:
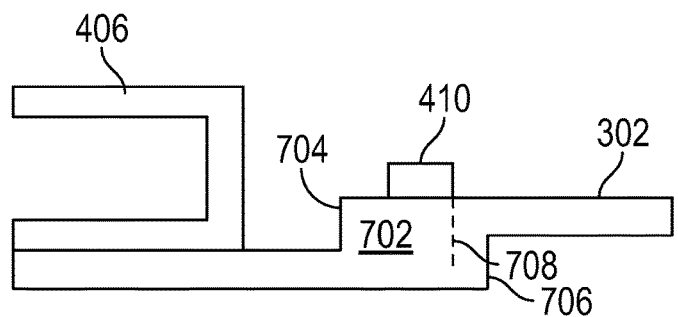
FIG. 7A is a conceptual cross-section view with exaggerated proportions showing a stepped or milled circuit board with a step that aligns a QSFP host connector and an OSFP edge connector, as an alternative to the flex circuit board of FIG. 6 in accordance with some embodiments.

FIG. 7A is a conceptual cross-section view with exaggerated proportions showing a stepped or milled circuit board 702 with a step that aligns a QSFP host connector 406 and an OSFP edge connector 302, as an alternative to the flex circuit board 602 of FIG. 6. Electronic circuits 410 are mounted to the circuit board 702 and connect to the OSFP edge connector 302 and the QSFP host connector 406 using circuit board traces and vias 708. The circuit board 702 has two steps 704, 706, which could be created by milling (see FIGS. 8 and 9) or by building up various shaped pieces in a lamination. Varied heights afforded by one or more steps 704, 706 of the circuit board 702 allow the OSFP edge connector 302, which is part of the circuit board 702 at one height, and the QSFP host connector 406, which is mounted to the circuit board 702 at another, different height (or elevation), to be aligned in accordance with height or other dimensional requirements of respective standards. That is, the stepped or milled circuit board 702 allows the OSFP edge connector 302, formed as the card edge of the circuit board 702, to engage with the OSFP host connector 408 in the OSFP host 104 and steps down to support the correct height for the QSFP connector 406 mounted to the circuit board 702 to engage the QSFP edge connector 404 of the QSFP transceiver 106.

Figure 7B:
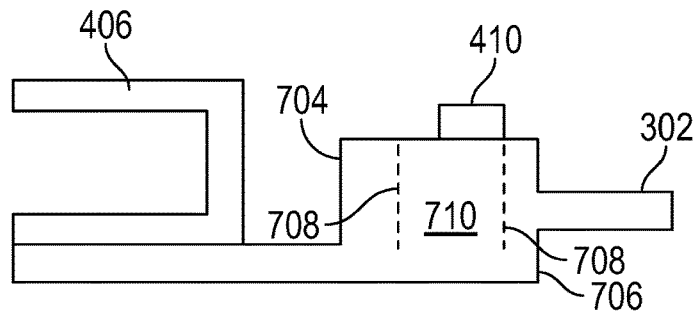
FIG. 7B is a conceptual cross-section view with exaggerated proportions showing a stepped or milled circuit board that aligns a QSFP host connector and an OSFP edge connector, as a further embodiment alternative to the flex circuit board of FIG. 6.

FIG. 7B is a conceptual cross-section view with exaggerated proportions showing a stepped or milled circuit board 710 that aligns a QSFP host connector 406 and an OSFP edge connector 302, as a further embodiment alternative to the flex circuit board 602 of FIG. 6. As in the embodiment shown in FIG. 7A, electronic circuits 410 are mounted to the circuit board 710, and varied heights afforded by one or more steps 704, 706 align the OSFP edge connector 302, which is part of the circuit board 710, and the QSFP host connector 406. In the embodiment in FIG. 7B, a central portion of the circuit board 710 is thicker than the embodiment shown in FIG. 7B, and the OSFP edge connector 302 projects from a portion of the circuit board 710 that has been stepped down as well as stepped up, or has both faces of the circuit board milled. Electronic circuits 410 electrically connect to the OSFP edge connector 302 and the QSFP host connector 406 using circuit board traces and vias 708.

Figure 8:
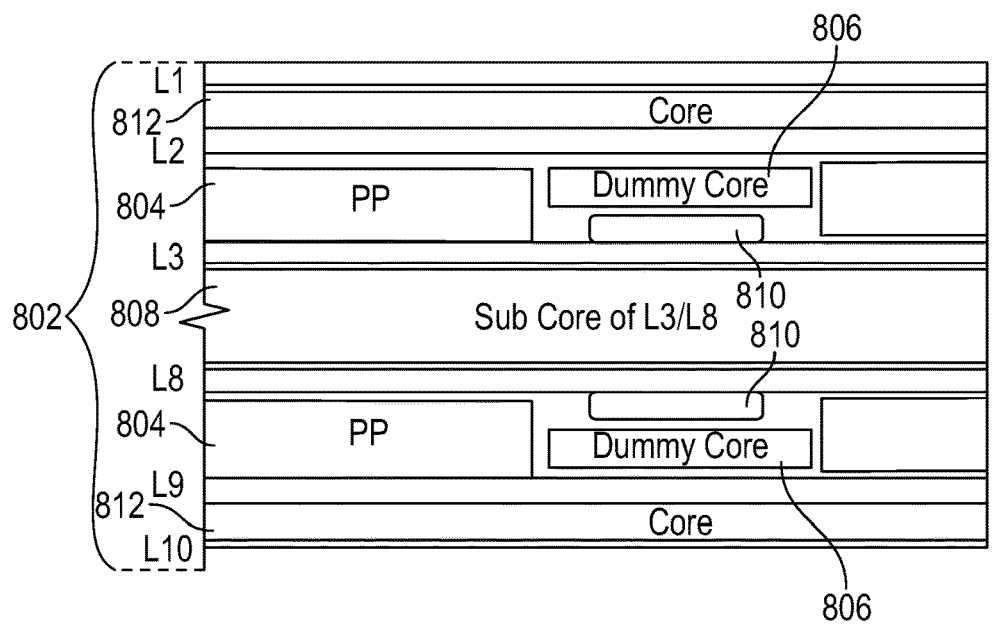
FIG. 8 is a cross-section view with exaggerated proportions of a circuit board with one or more dummy cores, prepared for milling in accordance with some embodiments.
Figure 9:
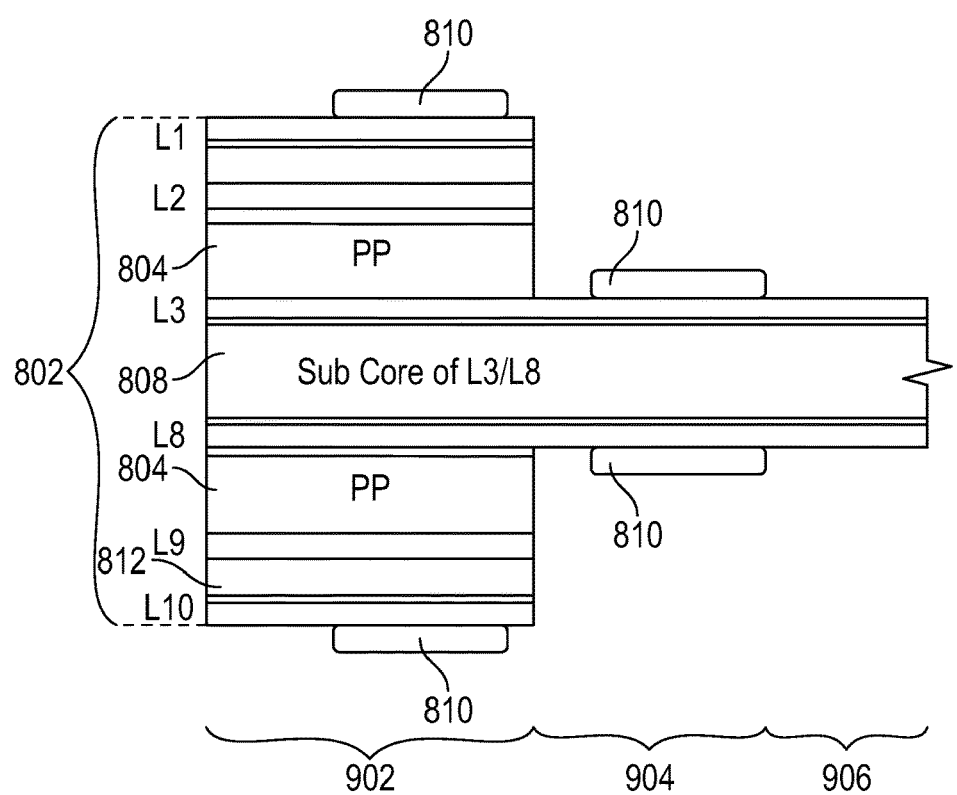
FIG. 9 is a cross-section view with exaggerated proportions of the circuit board of FIG. 8 after milling, as applicable to embodiments of a stepped or milled circuit board in accordance with some embodiments.

FIG. 8 is a cross-section view with exaggerated proportions of a circuit board with one or more dummy cores, prepared for milling. The circuit board is made of multiple layers 802, laminated together. Gold plating 810 on opposed faces of a sub core 808 of the circuit board are accompanied by dummy cores 806 made of a material that does not bond to cores 812, the sub core 808, or the gold plating 810. Thus, during a milling process dummy cores 806 will drop off to expose sub core 808 as illustrated in FIG. 9. Pre-preg 804, i.e., pre-impregnated, e.g. with the epoxy or other matrix material, or other suitable material utilized for circuit board manufacturing, is used in other regions of the layer(s) outside of where the dummy core 806 and gold plating 810 are placed.

FIG. 9 is a cross-section view with exaggerated proportions of the circuit board of FIG. 8 after milling, as applicable to embodiments of a stepped or milled circuit board. The milling process removes, in specified regions 904, layers 802 including L1, core 812 and L2 on one side of the circuit board, and L10, core 812 and L9 on the other side of the circuit board, above and below the gold plating 810 and dummy cores 806. The dummy cores 806 can be mechanically or chemically removed in some embodiments. Further milling or sawing removes further layers, including L3, sub core 808 (e.g., layers L4-L7, not shown) and L3 in a specified region 906. This process leaves the gold plating 810 intact in the top and bottom regions 904, so that the projection in the regions 904 becomes an edge connector, for example. Further gold plating 810 on other layers (e.g., L1 and L10) could be made for other electrical contacts. Variations on the example and process depicted in FIG. 9 can readily produce the embodiments of the stepped or milled circuit board shown in FIGS. 7A and 7B.

Figure 10:
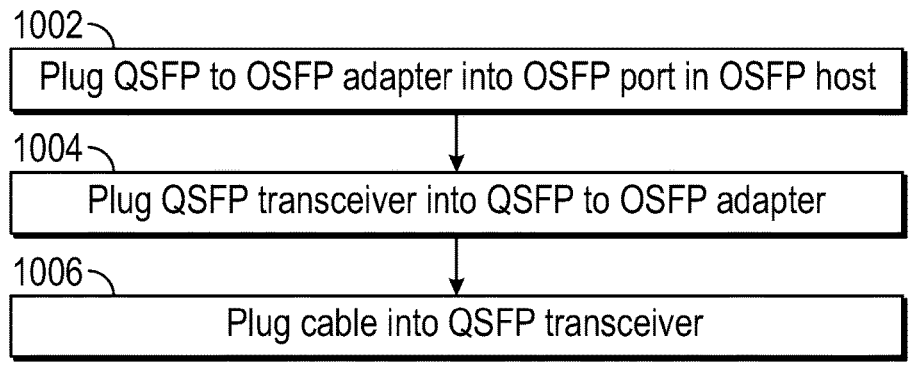
FIG. 10 is a flow diagram of a method for using a communication adapter, which can be practiced using embodiments of the QSFP to OSFP adapter disclosed herein in accordance with some embodiments.

FIG. 10 is a flow diagram of a method for using a communication adapter, which can be practiced using embodiments of the QSFP to OSFP adapter disclosed herein. In an action 1002, the QSFP to OSFP adapter is plugged into or connected to the OSFP port in an OSFP host. In some embodiments, this is accompanied by latching the QSFP to OSFP adapter into the OSFP port. In an action 1004, a QSFP transceiver is plugged into or connected to the QSFP to OSFP adapter. In an action 1006, a cable is plugged into the QSFP transceiver. Variations of the method include performing the action 1004 prior to the action 1002 and/or performing the action 1006 prior to the action 1002 or the action 1004.

Figure 11A:
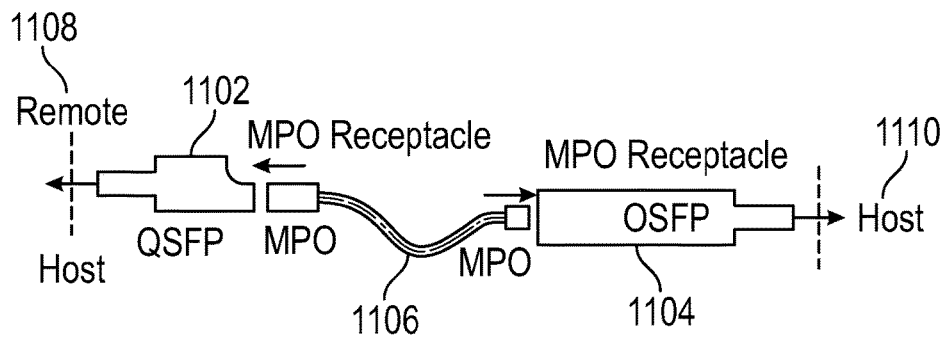
FIG. 11A depicts an alternative solution for adaptation using specialized modules in accordance with some embodiments.

FIG. 11A depicts an alternative solution for adaptation using specialized modules. Here, the QSFP transceiver 1102, connected to a remote host 1108, uses optical cable 1106, as does the OSFP transceiver 1104, connected to the local host 1110. Each of the QSFP transceiver 1102 and the OSFP transceiver 1104 is an optical module pluggable module, and accepts optical cable, for example MPO as depicted, or LC. But, the solution of FIG. 11A may not work if the QSFP transceiver 1102 and OSFP transceiver 1104 have incompatible optical cable requirements (e.g., one of them accepts LC, the other accepts MPO).

Figure 11B:
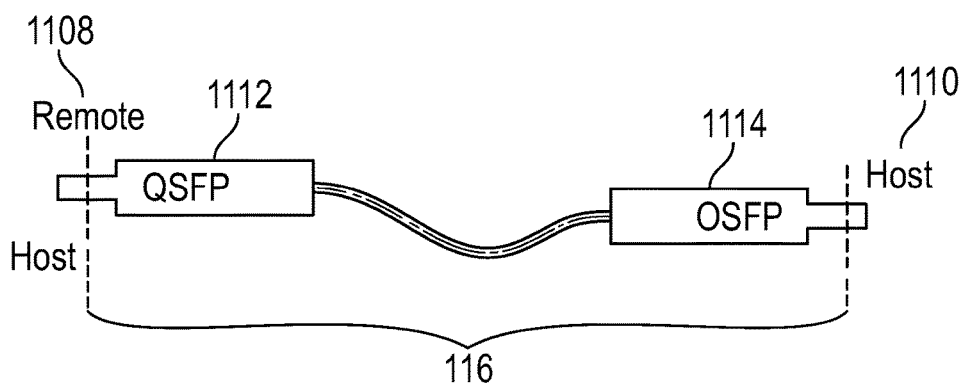
FIG. 11B depicts an alternative solution for adaptation using a specialized cable in accordance with some embodiments.

FIG. 11B depicts an alternative solution for adaptation using a specialized cable 1116. One connector of the cable 1116 is a QSFP connector 1112, shown connecting to the remote host 1108. The other connector of the cable 1116 is an OSFP connector 1114, shown connecting to the local host 1110. The solution of FIG. 11B requires a custom cable with the connectors. And, to retrofit the existing cables, the solution requires removal and replacement of the cable with the new, specialized cable 1116, or retrofitting OSFP connectors 1114 onto cables in the field. Accordingly, the solution in FIG. 11B is more labor-intensive and may be impractical in some cases.

Figure 11C:
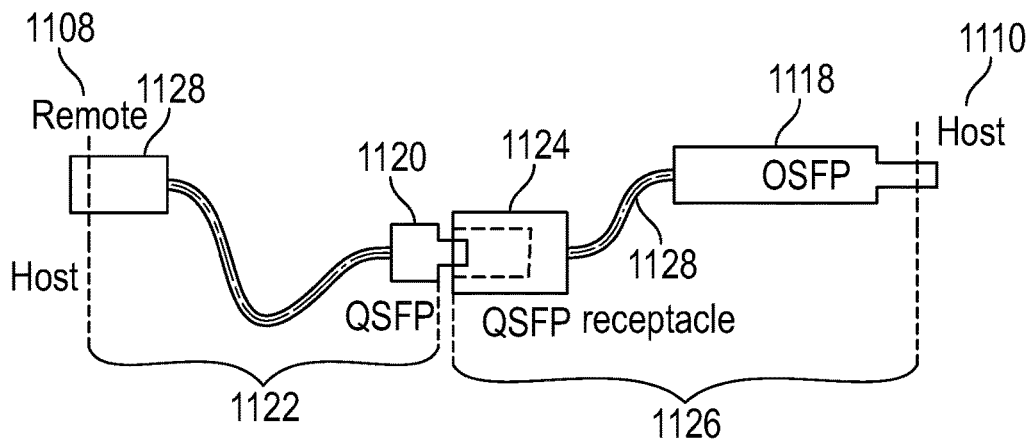
FIG. 11C depicts an alternative solution for adaptation using a specialized adapter with cable in accordance with some embodiments.

FIG. 11C depicts an alternative solution for adaptation using a specialized adapter 1126 with cable 1128. One connector of the cable 1128 is a QSFP host connector 1124, and the other connector of the cable 1128 includes an OSFP transceiver 1118. The OSFP transceiver 1118 of the specialized adapter 1126 plugs into the local host 1110. The QSFP host connector 1124 of the specialized adapter 1126 receives a QSFP connector 1120 from one end of a cable 1122 connected at the other end to a remote host 1108, for example by a QSFP connector 1128. The solution in FIG. 11C requires extra cable management as compared to the embodiments described, as shown in FIG. 11D, and is difficult to debug when there is an issue.

Figure 11D:
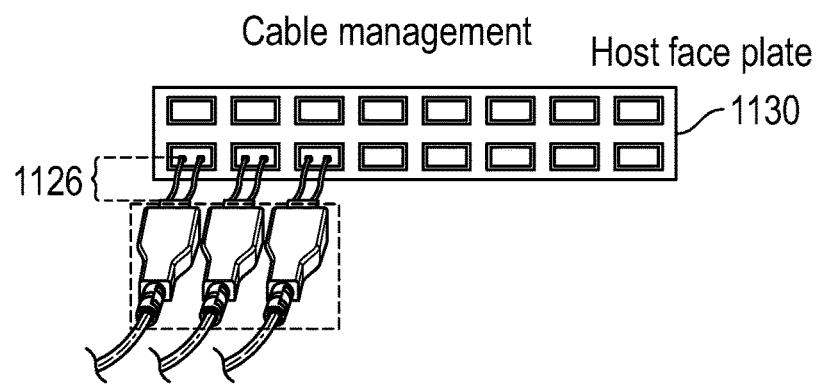
FIG. 11D depicts cable management at a host faceplate, using the alternative solution of FIG. 11C in accordance with some embodiments.

FIG. 11D depicts cable management at a host faceplate 1130, using the alternative solution of FIG. 11C. Three of the specialized adapters 1126 are shown plugged into the host faceplate 1130. The large amount of dangling cables and connectors, and each communication path traveling through two cables in series with attendant reliability and reflection issues would need to be addressed in this embodiment.

In comparison to the alternative solutions of FIGS. 11A-11D, the QSFP to OSFP adapter 102 described with reference to FIGS. 1-10 takes a small amount of space, is easy to use and is cost-effective, without requiring labor-intensive replacement of cables. The QSFP to OSFP adapter 102 reuses existing QSFP transceivers 106 when an OSFP host 104 is installed as an upgrade, and the OSFP host 104 can use OSFP transceivers 108 at the same time as QSFP transceivers 106. The presence of a flex, stepped or milled circuit board inside the QSFP to OSFP adapter 102 supports alignment of QSFP transceivers 106 with a range of heights, to the OSFP host ports 110. The QSFP to OSFP adapter 102 is not specific to a particular cable.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An adapter for a communication transceiver and a communication host, comprising:
   a first end having an OSFP (octal small form factor pluggable) connector for connection to an OSFP host port;
   a second end having a QSFP (quad small form factor pluggable) host connector for receiving a QSFP connector; and
   a circuit board, mounted in a housing, having a first height at the first end of the housing and a differing, second height at the second end of the housing to align an OSFP connector to the OSFP host port and align a QSFP host connector to the QSFP transceiver.

2. The adapter of claim 1, wherein the circuit board includes a flex circuit board connected to the OSFP connector and the QSFP host connector, with the flex circuit board flexed to align the QSFP host connector and the OSFP connector.

3. The adapter of claim 1, wherein the circuit board includes a milled circuit board connected to the QSFP host connector and the milled circuit board having the OSFP connector at the first end of a main body, with the milled circuit board having more than one thickness or height arranged to align the QSFP host connector and the OSFP connector.

4. The adapter of claim 1, wherein the circuit board is disposed within a main body and the main body is dimensioned to embed the QSFP transceiver into the adapter.

5. The adapter of claim 1, further comprising:
   at least one additional circuit board in a main body of the adapter, the at least one additional circuit board having a PLD (programmable logic device) and an EEPROM (electrically erasable programmable read-only memory), configured to make signals compatible for the QSFP transceiver and the OSFP host.

6. An adapter for a communication transceiver and a communication host, comprising:
   a circuit board within a housing of the adapter, the circuit board having an OSFP edge connector located at a first height or elevation of the circuit board and a QSFP host connector located at a second height or elevation of the circuit board.

7. The adapter of claim 6, wherein the circuit board includes a flex circuit board connected to the OSFP edge connector and the QSFP host connector, with the flex circuit board flexed to align the QSFP host connector and the OSFP edge connector.

8. The adapter of claim 6, wherein the circuit board includes a milled circuit board connected to the QSFP host connector and the milled circuit board having the OSFP edge connector at the first end of a main body, with the milled circuit board having more than one thickness or height arranged to align the QSFP host connector and the OSFP edge connector.

9. The adapter of claim 6, wherein the circuit board is disposed within a main body and the main body is dimensioned to embed the QSFP transceiver into the adapter.

10. The adapter of claim 6, further comprising:
    at least one additional circuit board in a main body of the adapter, the at least one additional circuit board having a PLD (programmable logic device) and an EEPROM (electrically erasable programmable read-only memory), configured to make signals compatible for the QSFP transceiver and the OSFP host.

11. The adapter of claim 6, further comprising:
    a housing having opposed first and second ends, the housing dimensioned so that, when a QSFP transceiver is received by the QSFP host connector, the QSFP transceiver is embedded in the housing.

* * * * *